United States Patent Office 2,845,023
Patented July 29, 1958

2,845,023

MECHANICAL PRINTING OF DAYLIGHT FLUORESCENT COMPOSITIONS

Joseph L. Switzer, Cleveland Heights, and Robert C. Switzer, South Euclid, Ohio, assignors to Switzer Brothers, Inc., Cleveland, Ohio, a corporation of Ohio No Drawing. Application February 21, 1950
Serial No. 145,592

14 Claims. (Cl. 101—426)

This invention relates to an improvement in the art of producing daylight fluorescent products and, more particularly, to the mechanical printing of daylight fluorescent coating compositions. This application is a continuation-in-part of our copending application for Fluorescent Compositions, Serial No. 414,285, filed October 9, 1942, and for Daylight Fluorescent Pigment Compositions, Serial No. 575,364, filed January 30, 1945, and Serial No. 57,932, for Daylight Fluorescent Displays, filed November 2, 1948. Application Serial No. 575,364 issued as U. S. Patent No. 2,498,592 on February 21, 1950 and Application Serial No. 57,932 was abandoned in favor of said patent.

One important desideratum in producing visually striking color contrasts is the obtaining of colors of maximum brightness in delineated areas which can contrast sharply with adjacent areas. Brighter colors obviously reflect more light to the eye than duller colors, and, though the eye distinguishes by contrast, as a general rule the more light delineated areas of a display direct toward the eye, the more effective the display is. In producing printed displays and display products to be viewed in visible light, the art has heretofore been limited to inks containing dyes and/or pigments having "subtractive" colors, that is, dyes and/or pigments which exhibit color due to the phenomenon known as selective reflection and absorption. The irremedial fault of such subtractive colors, from the point of view of one desiring maximum brightness in a display, is that the subtractive colors cannot reflect more than a fraction of the visible light incident upon the subtractively colored area of the display. For example, a blue pigment which reflected as much as a half of the blue in incident white light was regarded as a good bright blue pigment. And since the blue light reflected by such a pigment would be but a minor percentage of the total amount of incident visible white light, the subtractive colors of prior printing inks make very inefficient use of the energy in incident white light.

In the above identified U. S. Patent No. 2,498,592, we have disclosed coating compositions which are capable of exhibiting color due to the phenomenon best described as "daylight fluorescence," the term "daylight" being used to describe natural sunlight and artificial polychromatic light generally referred to as "white" light and usually containing some ultraviolet. Such daylight fluorescent coating compositions may be so exceptionally bright that their colors, in contrast with ordinary subtractively colored compositions, appear to be different in kind rather than exhibiting an exceptional difference in degrees of brightness. The reason that such daylight fluorescent coating compositions may be so bright is that they contain fluorescent agents, termed "fluoragents," which not only exhibit color due to the phenomenon of selective reflection and absorption but also fluoresce in response to light which would be dissipated as heat by subtractive colors. Thus, red daylight fluorescent coating compositions may "project" (i. e. emit and reflect) over one hundred and twenty percent of the light of the same hue which is present in the incident daylight.

Unfortunately, when daylight fluorescent inks are applied by conventional mechanical printing methods, such as typographic, intaglio or planographic methods in which the sheet or web to be printed is given an impress from the inked plate and then dried, the daylight fluorescent inks do not exhibit the maximum daylight fluorescence of which they are capable, but rather are extremely pale and exhibit little daylight fluorescence.

If a subtractively colored ink lacks sufficient tinctorial strength, the usual practice in the printing art is to increase the proportion of coloring agent in the printing ink. If one follows this teaching of the prior art by increasing the proportion of fluoragent in our daylight fluorescent printing inks, an ink having increased tinctorial strength may be obtained but the daylight fluorescence of the ink will be destroyed, for reasons explained at length in our above identified U. S. Patent No. 2,498,592. Even daylight fluorescent printing inks having the maximum permissible proportion of fluoragent to vehicle will still be too pale to exhibit effective daylight fluorescence when printed by customary printing techniques. In order to obtain a coating of daylight fluorescent printing ink which will have the optimum amount of fluorescent dye per unit of area of surface covered and not exceed the maximum permissible proportion of fluoragent to volume of printing ink vehicle, as disclosed in our above disclosed copending U. S. Patent No. 2,498,592, the thickness of ink deposit required to produce effective daylight fluorescence exceeds that which can be applied by an impress according to conventional mechanical printing processes employing printing plates and inking mechanisms heretofore designed to print conventional subtractive colored printing inks. Such printed thicknesses or deposits as are required for satisfactory daylight fluorescence have heretofore been obtained by stenciling processes, such as the silk screen process, for example. The disadvantages of such stenciling processes, however, are that the processes are slow; the thick deposits of ink are slow to dry, with the result that slip-sheeting or racking of individual printed sheets is required; precise, accurate delineation is difficult to obtain; and if more than one color is to be printed, additional color can be printed only after allowing the preceding color to dry, with the result that registry is difficult to obtain.

We have, however, solved the above problems involved in daylight fluorescent printing and it is, accordingly, the object of this invention to provide a method for mechanically printing daylight fluorescent inks from mechanical plates. Advantages of this invention are that high speed, accurately delineated daylight fluorescent printing is obtained, instantaneous drying without slip-sheeting or racking is obtained, and a plurality of colors may be printed in one pass through the printing press, thus minimizing registry problems.

Other objects and advantages of this invention will be apparent from the following specification and claims.

As pointed out in our above identified U. S. Patent No. 2,498,592, optimum daylight fluorescence is obtained in coatings containing from approximately .00006 to .00003 gram of daylight fluorescing dye per square centimeter of surface covered at concentrations of less than .01 gram of dye per cubic centimeter of coating. The printed thickness of a dry daylight fluorescent film should vary from at least .001 to .002 inch and, when using a preferable concentration of fluoragent of somewhat less than .01 gram per cubic centimeter of coating, a minimum thickness of .003 inch may be required. Since the volatile solvent in a printing ink may run from about twenty to as high as forty percent by volume, this means that a mechanical printing plate would be required to deposit in one pass a thickness of printing ink varying from approximately 1 to as many as 5 mils. Printing plates depositing such thicknesses of conventional ink would obviously gum up and smear.

The type of plate generally able to carry successfully the greatest thickness of ink is the intaglio or gravure type of plate. Such plates are frequently used to deposit conventional inks, particularly the so-called transparent lacquer inks, in thicknesses as great as .5 mil. There are available on the market gravure presses designed for multicolor work in which as many as seven gravure rollers may be employed to deposit differently colored inks on the web being printed. There are also available on the market printing ink solvents such as "Butyl Cellosolve" (ethylene glycol monobutylether), "Butyl Carbitol" (diethylglycol ethylether), the so-called low boiling narrow cuts of petroleum, and the like, which have a low vapor pressure at ordinary room temperature and high vapor pressure at temperatures moderately elevated above room temperature. Thus, by the application of heat, these solvents permit the so-called "flash-drying" of printing inks immediately after application to the web. In general, we have found that the problem may be solved by modifying the multicolor gravure presses by providing the presses with successive duplicate intaglio rolls, each printing the same ink on the same areas of the web. This is in contradistinction to the usual practice on such multicolor presses of employing successive intaglio rolls which print different colors and/or different areas of the web. By employing printing inks having the proper proportion of daylight fluorescent fluoragent and flash-drying solvents, and then over-printing the same area with the same daylight fluorescent ink in a high-speed multicolor gravure press as described above, accurately delineated areas may be printed rapidly. The printed areas will have the desired daylight fluorescence, due to the fact that each daylight fluorescent area will have a plurality of thin coats of daylight fluorescent ink separately applied but fused together. The flash drying solvents will permit a layer of daylight fluorescent ink to be printed substantially immediately and in exact register, upon a preceding printed layer of daylight fluorescent ink without smearing or piling up; this result is due to the fact that the preceding layer of ink is substantially dry by the time the successive layer is applied. Thus, for example, if three successive layers of daylight fluorescent inks, containing about 33% solvent, are successively applied in the same area, each layer being initially about .5 mil thick, then allowing for evaporation of solvent, a final printed area will be obtained having a daylight fluorescent coating approximately one mil thick. It should thus be apparent that if .4 or .5 mil is the greatest ink thickness which can be deposited by a gravure roll, at least three successive duplicate and registered gravure impressions should be made to obtain a satisfactory daylight fluorescent printing. To expedite flash-drying, suitable means to heat the volatile solvent between successive impresses are preferably employed; such heating means may be open or radiant gas flames, infra-red lamps, or ultra high-frequency induction heating apparatus, although such heating means may be omitted between the first and second impresses if the printing is on a web having sufficient absorptive properties for the ink solvent.

It should also be pointed out that the foregoing requirement for a minimum thickness of a daylight fluorescent coating requires a diffuse reflecting under-surface on which the coating is applied. Since most webs to be printed are white, the web itself usually provides the necessary diffuse reflecting under-surface. Where the web is not white or is not of the same color as the daylight fluorescent ink, suitable steps should be taken to provide a proper under-coat.

Illustrative but not limitative examples of applications of this invention are as follows:

*Example 1*

A red daylight fluorescent printing ink is prepared from a daylight fluorescent pigment composed of a dye and a solvating carrier as disclosed in Example 5 of our U. S. Patent No. 2,498,592, a transparent resinous vehicle to bind the pigment, and a flash drying solvent, such as "Butyl Cellosolve," in sufficient quantity to impart the desired fluidity to the ink, so that in the ink the amount of solvent will be approximately 20% by volume and the proportion of the daylight fluorescent dye will be approximately .004 gram per cubic centimeter of the solids content of the solvating carrier. The ink is printed by means of a seven-color gravure press upon white poster paper having approximately 80% reflectance compared to a standard magnesia block. Each roll in the press applies an ink deposit approximately .5 mil thick, all succeeding deposits being in exact register with the first deposit and infra-red rays being used to flash-dry the ink between successive stages. The resultant deposit of a plurality of thin, dried, fused layers, being approximately 2.8 mils thick, contains very close to .00003 gram of meta diethylamino phenolphthalene hydrochloride per square centimeter of surface covered.

If desired delineated areas of other sheets are printed so that a conventional twenty-four sheet billboard poster will be provided to carry a design printed in the red daylight fluorescent ink. Since it is prefearble to employ the daylight fluorescent ink in large masses to obtain the maximum effect, some of the sheets of the billboard poster may be entirely covered with daylight fluorescent ink, and others may be covered in only limited areas. If the balance of the poster is printed in dark subtractive colors, the contrast ratio between the daylight fluorescent indicia and the non-fluorescent background may be many times higher than the contrast ratio obtainable if the indicia had been printed in non-daylight fluorescent colors. When viewed under many lighting conditions, the areas printed in daylight fluorescent colors appear to be artificially illuminated due to the fact that the daylight fluorescent indicia are actually emitting light as well as reflecting part of the incident white light; color photographs of signs having daylight fluorescent indicia and bordered with lighted neon tubes reveal that, under certain lighting conditions, i. e. at dawn, dusk, or in shadow, the daylight fluorescent indicia are actually brighter than the adjacent lighted neon tubing.

*Example 2*

An ink similar to that employed in Example 1 is prepared, except that the pigment employed contains approximately .01 gram of daylight fluorescing dye per cubic centimeter of solvating carrier. The ink is deposited in register from the first three rolls of a multicolor gravure press on a white sulfite-surfaced carton stock, the resultant deposit of daylight fluorescent ink, when dry, being approximately 1.2 mils thick. The carton stock is then blanked and formed into cartons. When displayed in windows or on store shelves, particularly if the daylight fluorescent design employs large masses of the color and if the carton is displayed in daylight, the cartons will make surrounding subtractive-colored cartons appear dark and dull, thus drawing the customers' attention to the daylight fluorescent printed carton.

*Example 3*

A carton is produced similarly to that disclosed in Example 2, except that a second daylight fluorescent ink, similar to that employed in Example 1 but for the different color of the fluoragent, is printed in areas adjacent to areas printed in Example 1. If a seven roll gravure press is employed, a second daylight fluorescent color may be printed by the three rolls which succeed the first three rolls.

The final roll may be employed to print an ordinary subtractive color to border, shade, or otherwise complement the daylight fluorescent printed areas.

Example 4

A daylight fluorescing ink is prepared by dissolving a cellulose ester, such as cellulose acetate in the flash drying solvent, the proportion of solvent to solids content being sufficient to impart the desired fluidity to the ink. A quantity of dye or fluoragent is then solvated in the cellulose acetate in such proportion that the fluoragent, such as meta diethylaminophenol-phthalein hydrochloride, will constitute approximately .01 gram per cubic centimeter of the cellulose acetate.

A transparent film, such as cellulose acetate, is fed into a multi-roll gravure press and the first roll deposits an under-coat of white opaque ink on the web at the areas to be covered by the daylight fluorescent design: subsequently deposits of the daylight fluorescent ink are then printed in register with the white under-coat, until the desired depth of deposit of daylight fluorescent ink is obtained, to provide a daylight fluorescent design on white-printed surface of the transparent web.

Example 5

A transparent web is printed in the manner disclosed in Example 4, except that the deposits of daylight fluorescent ink are printed directly on the web and a final over-coat of white opaque ink is printed on the daylight fluorescent deposit. The daylight fluorescent design is then viewed from the opposite side through the web.

Example 6

To provide a daylight fluorescent design which will be visible from both sides of a transparent web, a web is printed as in Example 5 and then successive layers of daylight fluorescent ink are deposited on the white overcoat. In a seven roll gravure press, this is accomplished by printing the web with three rolls depositing daylight fluorescent ink, one roll depositing a white intermediate coat and then printing the desired design with three rolls depositing daylight fluorescent ink in register with the first layers and the intermediate white layer.

Example 7

A web of transparent film is printed as in Example 5, except that the final white over-coat is omitted. Instead, the film is laminated to a glazed white paper. This laminated product may be used as cover stock for advertising pamphlets, books and the like.

The deposition of delineated areas of daylight fluorescent inks by the preceding examples has the advantages of permitting the use of substantially conventional printing machinery and inks which behave in substantially the same manner as conventional subtractive colored inks. The outstanding disadvantages of the preceding examples is that multiple impresses are required and, due to the loss of solvent in each repeated impress, the "mileage" of the daylight fluorescent inks, in terms of square feet of printed area per gallon of ink, is poor. While the mileage of daylight fluorescent inks will seldom approach that of conventional subtractive color inks due to the thickness of deposit required for high chroma and purity of color (relative lack of pastelness) in daylight fluorescent colors, we have found several alternative types of novel daylight fluorescent printing compositions and methods of printing them which substantially eliminate the solvent loss of the preceding examples and minimize the repetitive impresses, permitting the printing of daylight fluorescent areas with one impress in most instances. The elimination of excessive solvent loss and repetitive impresses as obtained with the following alternative procedures and compositions is offset by the fact that usually special attachments to conventional printing equipment is required. Whether the procedures set forth in the preceding examples or in any one of the alternative procedures set forth below will be more economical and, therefore, preferable, will depend upon factors pertinent to each given situation.

A general characteristic of the several alternative procedures and printing compositions is that printing is accomplished while the daylight fluorescent printing composition is in a relatively semi-fluid and tacky condition and solidifies without an appreciable loss of volume. Since it is possible to obtain good daylight fluorescence with printed films having an approximate minimum thickness of 1 mil and since the following alternative daylight fluorescent printing compositions and processes will often permit the deposition of films as thick or thicker than 1 mil, single impress printing of daylight fluorescent inks is thereby frequently obtainable. Even if multiple impresses are necessary, the number of impresses which would be required according to the preceding examples are reduced and the solvent losses are eliminated or greatly minimized.

In such single or minimum impress printing, intaglio plates are generally preferred, since the depth of daylight fluorescent printing composition deposited may be precisely controlled by the depth of etch in the plate and the plates may frequently be more deeply etched than when used for printing conventional solvent-type inks. Typographic plates may be employed, but generally impose the problem of controlling the viscosity of the printing composition and the thickness thereof on the inking rolls so that the desired thickness of composition will be picked up on the raised surface of the plate and deposited on the web to be printed with insufficient pressure to squeeze out the relatively fluid composition from between the type face and the web to be printed.

Planographic offset printing may also be accomplished by printing the daylight fluorescent composition in the required thickness on the transfer web or blanket and then offsetting onto the web to be printed after the daylight fluorescent composition has set or hardened sufficiently to withstand the offsetting pressure. One very simple type of offset printing is practiced by printing daylight fluorescent indicia in the desired thickness upon glassine or wax-coated films and then after the indicia has hardened, offsetting the indicia onto the web to be printed by means of a heated iron or platen applied to the back of the transfer web (nearly all daylight fluorescent printing compositions are thermo-adhesive or may be rendered so by means of an over-print of thermo-adhesive material).

A relatively simple procedure and composition for single impress daylight fluorescent printing comprises the application to the mechanical printing plate of a molten printing composition comprised of a normally solid thermo-plastic vehicle and a daylight fluorescent dye and/or pigment dispersed therein. With the molten composition deposited in or on the mechanical plate in the desired thickness, the daylight fluorescent composition is transferred from the plate to the web to be printed while the composition is in a tacky condition. By cooling the composition on the web, the printed composition is solidified in the desired thickness to produce daylight fluorescent indicia.

To obtain a normally tack-free print, the vehicles for the above generally described "hot-melt" printing compositions preferably have a freezing point in excess of approximately 65° C. To avoid injury to the daylight fluorescent dyes and/or pigments and the web to be printed upon and also to avoid excessive equipment costs, the hot-melt vehicle will preferably have a printable viscosity below 250° C. The preferred hot-melt vehicles have a narrow freezing point range only slightly above the minimum freezing point permissible to maintain tack-free printing at ambient temperatures likely to be encountered during subsequent use or conversion of the printed web. Such preferred vehicles permit, on the one hand, the use of lower temperatures to maintain printable fluidity and thereby permit the use of daylight fluorescent dyes which might be injured at higher temperatures and, on the other hand, permit the ink to be set almost immediately on the web, thereby allowing higher speed printing.

In carrying out the above outlined hot-melt printing of daylight fluorescent compositions, the ink reservoirs, doctor blades, inking rolls, and like equipment are heated, usually electrically, to a temperature slightly in excess of the melting point range of the daylight fluorescent composition. The web to be printed is usually at room temperatures (25–30° C.) but may be chilled to a lower temperature before or immediately after contact with the printing plate in order to shorten the time for setting the ink. The running temperature of the mechanical printing plate is usually at the freezing point range of the printing composition, although, depending upon the characteristics of the printing composition, in some instances release of the composition from the plate to the web is improved by heating the plate above the melting range of the composition and, in other instances, release from the plate and speed of setting are improved by chilling the plate.

Illustrative but not limitative examples of satisfactory hot-melt daylight fluorescent printing compositions are set forth in the following Examples 8 to 11, in which the daylight fluorescent pigment may be any one of those described in our above mentioned U. S. Patent No. 2,498,592.

*Example 8*

| | Parts by weight |
|---|---|
| Daylight fluorescent pigment | 50 |
| Ethyl cellulose | 5 |
| Beeswax (white) | 45 |

(Printable at 80° C.)

*Example 9*

| | Parts by weight |
|---|---|
| Daylight fluorescent pigment | 12 |
| Ethyl cellulose | 1 |
| Beeswax (white) | 9 |
| Varnish 00 (boiled linseed oil) | 2 |

(Printable at 85° C.)

*Example 10*

| | Parts by weight |
|---|---|
| Daylight fluorescent pigment | 50 |
| n-butyl methacrylate | 5 |
| Beeswax (white) | 45 |

(Printable at 85° C.)

*Example 11*

| | Parts by weight |
|---|---|
| Daylight fluorescent pigment | 50 |
| n-butyl methacrylate | 10 |
| Beeswax (white) | 40 |

(Printable at 100° C.)

In the foregoing examples, the freezing temperature range may be decreased or increased by decreasing or increasing the proportion of ethyl cellulose or butyl methacrylate with respect to the beeswax in the resin-wax vehicle for the daylight fluorescent pigment. Vehicles comprised essentially of resin-wax mixtures, mixtures of resins, mixtures of waxes, or like mixtures of thermoplastic ingredients, generally provide the most satisfactory results although, usually less satisfactorily, a vehicle containing a single thermoplastic ingredient may be employed. In place of the beeswax, other microcrystalline waxy materials may be employed, such as animal, vegetable, or mineral waxes (preferably modified with naturally-occurring or added crystalization-inhibiting petroleum or like resins), high melting-point alcohols and esters, hydrogenated oils and oil acids, and high-melting soaps may be employed.

In place of the cellulose ether and alkyl acrylic acid resins shown in the examples, other relatively high melting thermoplastic resins may be employed, such as cellulose esters, modified and unmodified alkyds, polyvinyl and vinylidene resins, natural and synthetic petroleum and hydrocarbon resins, such as polyethylene, and the like may be employed. Flexibility may be imparted to the resins and compatible resin-wax mixtures by suitable plasticizers, and where ultimate tack-free characteristics are essential, air or heat hardened additives may be employed, such as the linseed oil varnish employed in Example 9 or low-temperature and pressure thermosetting resins of the allyl ester type.

In addition to the "hot-melt" type of solvent-less ink, another satisfactory relatively solvent-less daylight fluorescent ink having an insignificant loss of volume when set on the printed web is one in which the vehicle is essentially a "plastisol," i. e., a relatively fluid dispersion of a suitable elastomeric resin in a non-volatile plasticizer therefor, the plastisol being characterized by the ability to "kick-over" to a stable flexible gel of resin and plasticizer when raised to an elevated temperature. To print such a plastisol daylight fluorescent composition, the composition, thinned to the desired viscosity if necessary, is printed on the web in the desired thickness and is then heated to kick-over the plastisol vehicle and set the daylight fluorescent printing composition. The plastisol compositions are particularly satisfactory where the printed web is likely to be subjected to considerable flexing, as in wrapping and bag machines, for example. Due to the relatively poor adhesiveness of the elastomeric resins to dissimilar films, they are preferably printed on fibrous webs on which the gels will interlock with the surface fibers or on webs having a resinous surface coating to which the gels are adhesive. The preferable surface upon which the daylight fluorescent compositions are printed should also retain the desired whiteness when wetted with the plasticizer and not be darkened or rendered translucent by the tendency of the plasticizers to migrate from the gels.

The following are examples of suitable printable daylight fluorescent plastisol compositions in which the daylight fluorescent pigment may be any one of the pigments disclosed in our U. S. Patent No. 2,498,592.

*Example 12*

| | Parts by weight |
|---|---|
| Daylight fluorescent pigment | 45 |
| Powdered polyvinyl chloride | 23 |
| Di-octyl phthalate | 27 |
| Naphtha (paraffinic) | 5 |

The powdered polyvinyl chloride is ground into the plasticizer (di-octyl phthalate) and the daylight fluorescent pigment is ground into the dispersion. The thinner (naphtha) is added to adjust the resultant paste to the desired printing viscosity. After printing, the printed web is passed through a ventilated infra-red tunnel until the temperature of the plastisol is raised to 155° C. The kicked-over plastisol gel (thermoplastic at elevated temperatures) is then cooled to room temperature.

*Example 13*

| | Parts by weight |
|---|---|
| Daylight fluorescent pigment | 50 |
| Powdered vinyl chloride-vinyl acetate copolymer (20% vinyl acetate) | 25 |
| Di-octyl phthalate | 20 |
| Di-butyl phthalate | 5 |

The elastomeric resin and pigment are successively ground into the plasticizer, as in Example 12. The resultant paste is printed and the printed web is heated to 125° C. and then cooled.

*Example 14*

Still another relatively "solvent-less" daylight fluorescent printing composition comprises a "steam-set" ink in which a daylight fluorescent pigment is ground into a vehicle comprising a solution of an anhydrous hygroscopic solvent for a resin which is insoluble in aqueous solutions of the solvent. An example of such a vehicle is a 15% solution of ethylene glycol in polyvinyl formal or a like acetal of polyvinyl alcohol. After printing the resultant paste on a fibrous web, the web is subjected to dry steam jets. As the steam is absorbed by the glycol, the resin is deposited on the web from the aqueous-glycol solution which, in turn is absorbed in the web and/or volatilized off by the heat of the dry steam.

In all of the foregoing examples, the vehicle for the daylight fluorescent pigment or the solvated daylight fluorescent dye is substantially transparent to both visible and near ultraviolet light. It is also to be noted that in all of the examples employing a daylight fluorescent pigment (made according to our U. S. Patent No. 2,498,592 and containing approximately 1% of solvated daylight fluorescent dye) the proportions of vehicle to pigment in the resultant printed ink are approximately equal. In such proportions, daylight fluorescent indicia of full chroma and purity will be obtained when the thickness of these printed daylight fluorescent compositions is from 1.25 to approximately 2 mils, an optimum thickness being approximately 1.5 mils. As pointed out in said patent, there is not only an upper limit to the concentration of daylight fluorescent dye in its solvating carrier but also an optimum and an upper limit to the number of molecules of dye per unit of area. If any one of these upper limits are exceeded, either as to the concentration of dye in the solvating carrier or as to the number of solvated dye molecules per unit of area, the daylight fluorescence of the dye will be destroyed. With these general principles in mind, it is obvious that, for any given concentration of solvated dye less than the upper limit of concentration permitting daylight fluorescence, (a) there is an upper limit to the thickness of composition which may be printed if it is to retain daylight fluorescence; (b) there is an optimum thickness for the printed composition; and (c) there is a practical minimum thickness if daylight fluorescence of full chroma and purity of color is to be obtained, but no minimum thickness for pastel shades and daylight fluorescent tints. Stated specifically with respect to known daylight fluorescent dyes the proportions are as follows:

".0005 gram of solvated dye per square centimeter of dry ink is a practical maximum in any daylight fluorescent system composed of a single dye and a solvating material.

.00006 to .00003 gram of daylight fluorescent dye per square centimeter of surface covered [and at concentrations of less than .01 gram per cubic centimeter of ink] will produce optimum daylight fluorescence.

.000015 gram of daylight fluorescing dye per square centimeter is the minimum amount of dye which will exhibit daylight color, although for purposes of tints, no practical minimum has been found, since daylight fluorescent tinting effects have been noted in dilutions exceeding one part of daylight fluorescing dye in many million parts of solvating material."

While further study of the phenomenon of daylight fluorescent dyes and pigments indicates the above proportions may have to be translated from terms of grams of dye to terms of the number of chromophoric group and fluorophoric groups capable of responding to incident visible as well as ultraviolet light if and when all such groups can be identified, it is also apparent that if any new daylight fluorescent dyes and pigments are found not to answer to the above specifically stated maxima, optima, and practical minimum, the variations therefrom will be proportional.

As indicated by Example 4, it is not necessary that daylight fluorescent pigments comprising a solvated daylight fluorescent dye and a resinous carrier be employed as the only fluoragent in the printing compositions. Instead, the printable composition may be unpigmented and carry the daylight fluorescent dye solvated in the non-volatile vehicle. Or the compositions may comprise a daylight fluorescent pigment and a vehicle in which a daylight fluorescent dye will remain solvated in less than the maximum permissible concentration. It is generally less desirable to solvate the dye in the vehicle since the dyes are seldom as stable as when solvated in a resin pigment and may tend to become over-concentrated at the surface of the printed compositions. Solvation of the dye in the printed vehicle, however, usually permits the use of thinner printed thicknesses and, where the vehicle is also pigmented, the instability and possible over-concentration of the dye solvated in the vehicle is usually less apparent than when no pigments are employed.

Regardless of whether the fluoragent is carried into the finished printed indicia in the form of a pigment, a dye solvated in the vehicle, or both, and whether or not the relatively fluid printing composition is printed by a single impress or by multiple impresses, application of the principles of this invention reveal that, in the final printed indicia, the fluoragent must never be concentrated in the resultant solidified component of the printing composition in a concentration in excess of the maximum permissible for daylight fluorescence of that fluoragent and, of course, the fluoragent must be dispersed in a daylight fluorescent state in said component. Further, assuming uniform thickness of deposit in a given delineated area, the maximum thickness of daylight fluorescent printing composition which can be deposited may be computed according to the formula:

$$T=\frac{M}{pc} \qquad (a)$$

where T is the maximum thickness of composition to be printed, M is the maximum amount of the fluoragent (per unit of area) permitting daylight fluorescence, p is the proportion of the volume of solidifiable component, when solidified, in a given volume of the printing composition, and c is the concentration of fluoragent in the solidifiable component of the composition (expressed in terms of amount of fluoragent/unit volume of composition per volume of solidifiable component, when solidified/unit volume of composition). Similarly, $$t=\frac{m}{pc} \qquad (b)$$

where t is the minimum thickness of the printing composition to be printed for full chroma of the daylight fluorescent composition, m is the minimum amount of the fluoragent per unit of area permitting full chroma of the daylight fluorescent fluoragent, and p and c are in formula (a) above. (Note that the volume of the fluoragent must be included in the volume of the solidifiable component.)

It is frequently desirable to print thicknesses of the compositions giving less than full chroma and purity of the daylight fluorescent hues, not only for the attractive tints produced, but also, when printed with subtractive colors in the same delineated areas to give a bloom to the subtractive colors. Such subtractive colors are preferably translucent; particularly when printed over or simultaneously with the daylight fluorescent compositions; the bloom produced is usually more pronounced when the hue of the subtractive color is the same or adjacent to the hue of the daylight fluorescent color.

Except for the fact that daylight fluorescent printing is not yet as resistant to weathering as non-daylight fluorescent printing, any printed device or article intended to attract the eye and coming within the broad scope of a signalling or display device will usually be more effective if printed with daylight fluorescent printing. Such signalling and display devices may range from billboards and posters and similar devices for advertising purposes to articles of wearing apparel and from military maps to fish lures, to give a few examples illustrating the scope of the field in which daylight fluorescent printing is useful. The supporting structures upon which the daylight fluorescent compositions are printed are usually sheets and webs of fibrous and non-fibrous material such as paper, fabric, films and like organic materials, but the supporting surfaces are not limited to such materials or structures. For example, most metal and glass articles are intended for uses which would extend well beyond the life of the printed daylight fluorescent compositions, but where weathering or permanence is not a controlling factor, it is frequently desirable to print daylight fluorescent compositions on structures and devices of inorganic material, such as metal cans and glass jars used for packaging purposes.

In view of the foregoing modifications and illustrative species of our invention, it is apparent that our invention is not limited to the embodiments disclosed but only by the scope of the following claims.

What is claimed is:

1. The method of printing daylight fluorescent media comprising the steps of applying to a mechanical printing plate a relatively fluid and tacky daylight fluorescent composition comprised of a dispersed solvated daylight fluorescent fluoragent and a vehicle containing a non-volatile, transparent, relatively solidifiable component, the proportion of said fluoragent to said solidifiable component not exceeding the maximum concentration at which said fluoragent will exhibit daylight fluorescence; depositing, from said plate onto a delineated area of a receiving structure in a substantially uniform thickness, a volume of said composition providing an amount of fluoragent per unit of area between the maximum and minimum required to exhibit daylight fluorescence of full chroma and purity of hue; solidifying said component to a relatively non-tacky condition while retaining therein said fluoragent in a daylight fluorescent state; and removing the portion, if any, of said relatively fluid composition not retained in said solidified component.

2. The method of printing daylight fluorescent media as defined in claim 1 in which the vehicle of the composition applied to a mechanical printing plate contains a removable liquifying component in addition to said solidifiable componet and at least a fraction of said liquifying component is the portion removed in the step of removing a portion, if any, of said fluid composition not retained in said solidified component.

3. The method of printing daylight fluorescent media as defined in claim 1 in which said volume of daylight fluorescent composition is printed in successive impresses in the same delineated area, each impress printing a thickness equivalent to an aliquot fraction of the total thickness required for daylight fluorescence of substantially full chroma and purity and in which the solidifiable component of each impress prior to the ultimate impress is solidified to a relatively non-tacky condition prior to the succeeding impress.

4. The method of claim 3 in which the surface of the delineated area of the receiving structure diffusely reflects visible light of the hue of the daylight fluorescent composition.

5. The method of claim 4 in which the surface of the delineated area of the receiving structure is white.

6. The method of claim 3 in which the receiving structure is a transparent film and including the step of superimposing on said ultimate impress a layer having a surface adjacent said ultimate impress which diffusely reflects light of the hue of said daylight fluorescent composition.

7. The method of claim 6 in which the surface of said superimposed layer adjacent said ultimate impress is white.

8. The method of claim 3 in which the daylight fluorescent composition contains a volatile solvent for at least a portion of the solidifiable component thereof, said solvent being characterized by a relatively low vapor pressure at room temperature which increases to a relatively high vapor pressure at an elevated temperature at a rate greater than the rate of temperature increase and including the step of rapidly heating the position of composition deposited by each penultimate impress to flash dry the solidifiable component thereof prior to a successive impress.

9. The method of claim 3 in which a portion of the solidifiable component of the daylight fluorescent composition is thermoplastic and is characterized by solidifying above room temperature and including the step of coooling the fraction thereof deposited by a penultimate impress to its solidification point prior to a successive impress.

10. The method of claim 3 in which the solidifiable component of the daylight fluorescent composition includes a plastisol comprised of a resin and a non-volatile plasticizer therefor and including the step of heating the fraction thereof deposited by a penultimate impress to kick-over the plastisol to relatively stable gel prior to a successive impress.

11. The method of claim 3 in which the solidifiable component of the daylight fluorescent composition includes a solution of a hygroscopic anhydrous solvent and a resin soluble in said anhydrous solvent but insoluble in aqueous solution thereof and including the step of subjecting the fraction thereof deposited by a penultimate impress to water vapor to deposit the resin on the receiving surface prior to a successive impress.

12. The method of claim 1 in which the solidifiable component of the daylight fluorescent composition includes a vehicle of thermoplastic material having a melting point above room temperature and below temperature destructive to the fluoragent, and including the steps of heating the daylight fluorescent composition to a molten condition below the temperature destructive to the fluoragent, applying the molten composition to the printing plate in substantially the same thickness as the composition is to be applied to the receiving structure, applying the composition to the receiving structure in a tacky condition and in a single impress, and cooling the composition to room temperature after application to the receiving structure.

13. The method of claim 1 in which the solidifiable component of the daylight fluorescent composition includes a plastisol vehicle and including the steps of applying the composition to the printing plate in substantially the same thickness as the composition is to be applied to the receiving structure, applying the composition from the printing plate to the receiving structure in a single impress, heating the composition on the receiving structure to kick-over the plastisol to a gel and then cooling the gel to room temperature.

14. The method of claim 1 in which the solidifiable component of the daylight fluorescent composition includes a vehicle comprised of a solution of an anhydrous hygroscopic solvent in a resin insoluble in aqueous solution of the solvent, applying the composition to the printing plate in substantially the same thickness as the composition is to be applied to the receiving structure, applying the composition to the receiving structure in a single impress, and subjectng the composition to water vapor to remove the hygroscopic solvent and deposit the solidifiable component on the receiving structure.

References Cited in the file of this patent

UNITED STATES PATENTS

| | | |
|---|---|---|
| 1,928,758 | Mairson et al. | Oct. 3, 1933 |
| 2,147,651 | Jones et al. | Feb. 21, 1939 |
| 2,152,856 | Switzer | Apr. 4, 1939 |

(Other references on following page)

UNITED STATES PATENTS

| | | | |
|---|---|---|---|
| 2,219,205 | Boente | Oct. 22, | 1940 |
| 2,226,848 | Cornwell | Dec. 31, | 1940 |
| 2,244,103 | Erickson et al. | June 3, | 1941 |
| 2,254,072 | Jenkins | Aug. 26, | 1941 |
| 2,268,594 | Huber | Jan. 6, | 1942 |
| 2,277,169 | Switzer et al. | Mar. 24, | 1942 |
| 2,292,569 | King | Aug. 11, | 1942 |
| 2,302,645 | Switzer | Nov. 17, | 1942 |
| 2,322,445 | Huber | June 22, | 1943 |
| 2,375,177 | Reese | May 1, | 1945 |
| 2,375,660 | Jones | May 8, | 1945 |
| 2,379,236 | Jenkins | June 26, | 1945 |
| 2,486,258 | Chavannes | Oct. 25, | 1949 |
| 2,486,259 | Chavannes | Oct. 25, | 1949 |
| 2,498,592 | Switzer | Feb. 21, | 1950 |
| 2,498,593 | Switzer | Feb. 21, | 1950 |

OTHER REFERENCES

Powell et al.: A New Technique in Coatings, pages 696 to 702 of Official Digest No. 263, December 1946. (Copy available in Div. 50.)